United States Patent
Nagai et al.

(10) Patent No.: US 8,253,648 B2
(45) Date of Patent: Aug. 28, 2012

(54) PORTABLE TERMINAL

(75) Inventors: Michio Nagai, Tokyo (JP); Hideo Mitsuhashi, Tokyo (JP)

(73) Assignee: NEC Corporation, Tokyo (JP)

( * ) Notice: Subject to any disclaimer, the term of this patent is extended or adjusted under 35 U.S.C. 154(b) by 900 days.

(21) Appl. No.: 11/817,108

(22) PCT Filed: Mar. 2, 2006

(86) PCT No.: PCT/JP2006/304518
§ 371 (c)(1),
(2), (4) Date: Aug. 24, 2007

(87) PCT Pub. No.: WO2006/093328
PCT Pub. Date: Sep. 8, 2006

(65) Prior Publication Data
US 2009/0079664 A1    Mar. 26, 2009

(30) Foreign Application Priority Data

Mar. 2, 2005 (JP) .................................. 2005-057455

(51) Int. Cl.
*G09G 5/00* (2006.01)
(52) U.S. Cl. ............ 345/1.3; 345/1.1; 345/2.3; 345/169; 345/173; 345/901; 345/903; 361/679.27; 455/575.3; 248/917; 248/923; 248/924
(58) Field of Classification Search .................. 345/169, 345/13, 32, 905, 1, 903, 173, 1.1, 1.3, 901, 345/2.3, 30, 31, 33, 40; 349/58, 73; 361/681, 361/679, 27; 248/681, 278.1, 279.1, 282.1, 248/283.1, 920.921, 917, 923, 924; 348/373, 348/376; 16/221–392; 455/575.3
See application file for complete search history.

(56) References Cited

U.S. PATENT DOCUMENTS

| 5,734,513 | A | * | 3/1998 | Wang et al. ................... 359/742 |
| 6,047,196 | A | * | 4/2000 | Makela et al. .............. 455/556.1 |
| 6,262,785 | B1 | * | 7/2001 | Kim ................................. 349/58 |
| 6,577,496 | B1 | * | 6/2003 | Gioscia et al. .............. 361/679.3 |
| 6,643,124 | B1 | * | 11/2003 | Wilk ......................... 361/679.04 |
| 6,909,597 | B2 | * | 6/2005 | Tutikawa ................ 361/679.04 |
| 7,092,247 | B2 | * | 8/2006 | Kim ......................... 361/679.04 |
| 7,200,426 | B2 | * | 4/2007 | Kawamura ................ 455/575.3 |
| 7,548,415 | B2 | * | 6/2009 | Kim ......................... 361/679.27 |
| 7,869,204 | B2 | * | 1/2011 | Bair et al. .................. 361/679.3 |
| 2004/0036818 | A1 | * | 2/2004 | Kim et al. ....................... 349/58 |
| 2004/0135738 | A1 | * | 7/2004 | Kim et al. ...................... 345/1.1 |
| 2005/0261040 | A1 | * | 11/2005 | Andersson et al. ........ 455/575.3 |

(Continued)

FOREIGN PATENT DOCUMENTS

CN     1140271 A     1/1997

(Continued)

*Primary Examiner* — Lun-Yi Lao
*Assistant Examiner* — Olga Merkoulova
(74) *Attorney, Agent, or Firm* — Sughrue Mion, PLLC (57) ABSTRACT

A portable terminal comprises a first body 104 on which the first display surface 102 is formed, a second body 108 on which the second display surface 106 is formed, and hinge units which combine the first body 104 and the second body 108 in a foldable way. The first display surface 102 and the second display surface 106 form a combined display 112 continuously at a time of opening the first body 104 and the second body 108, and it further comprises a display control unit which displays one information on the whole combined display 112. Two display screens respectively formed in the individual bodies are used effectively.

9 Claims, 9 Drawing Sheets

U.S. PATENT DOCUMENTS

2006/0034042 A1* 2/2006 Hisano et al. .................. 361/681
2006/0264243 A1* 11/2006 Aarras .......................... 455/566

FOREIGN PATENT DOCUMENTS

| | | |
|---|---|---|
| CN | 2479283 Y | 2/2002 |
| DE | 101 08 089 A1 | 9/2002 |
| EP | 1 324 570 A1 | 7/2003 |
| JP | 10-039780 A | 2/1998 |
| JP | 11-249596 A | 9/1999 |
| JP | 3083256 U | 1/2002 |
| JP | 2002-118628 A | 4/2002 |
| JP | 2003-050554 A | 2/2003 |
| JP | 2003-167535 A | 6/2003 |
| JP | 2003-198685 A | 7/2003 |
| JP | 2004-308710 A | 1/2004 |
| JP | 2004-180021 A | 6/2004 |
| JP | 2004-198472 A | 7/2004 |
| JP | 2004-316382 A | 11/2004 |
| JP | 2004-336403 A | 11/2004 |
| WO | 02/091338 A1 | 11/2002 |
| WO | 2004/054317 A1 | 6/2004 |

* cited by examiner

PORTABLE TERMINAL

TECHNICAL FIELD

The invention relates to a portable terminal which comprises a first body and a second body combined with each other in a foldable way.

BACKGROUND ART

As a portable terminal such as a mobile phone, a PHS, and a PDA, the foldable structure having two bodies connected via a hinge is well known. In such a portable terminal, generally an operation unit is set in one body and a display surface is set in the other body. Specially, the operation unit and the display surface are arranged on the facing surfaces of the two bodies to make possible that a user opens the terminal and enters some operation through the operation unit while watching the display on the other surface. In the other body, a display is also set on the back surface of the facing surface to make possible that a user checks the display on the back surface even in a folding state.

As this kind of portable terminal, for example, Patent Publication Laid-Open No. 2003-198685 (Document 1) describes a mobile phone which comprises three bodies: of which the first body and the second body respectively including the displays are linked with each other through a hinge unit and the first body and the third body including the operation unit are linked with each other via a hinge unit. When a user opens the first body and the third body in this mobile phone, the operation unit and the display of the first body are exposed to the user side and the display surface of the second body is positioned at the opposite side of the user. When the user opens first body and the second body from this state, the display surface of the second body turns to the user side while keeping the positions of the first body and the third body as they are, hence to enable the user to check the both display surfaces of the first body and the second body. Each hinge is formed by the orthogonal shafts.

Each hinge is continuously formed with the bodies and has a cylindrical shell portion projecting from the bodies. The display surfaces of the first body and the second body are respectively formed in the inner portions of the bodies excluding their fringe portions. That is, the display surfaces are positioned side by side with the fringe portions and hinge portion intervening in a state of stretching the first body and the second body.

As mentioned above, in the mobile phone described in Document 1, since the display surfaces are positioned side by side with the fringe portions and the hinge of the bodies, it is impossible to display one information throughout the two display surfaces and the display surfaces cannot help but display the information separately. Since the display surfaces are separated, there is a problem that a user has to move his or her eyes comparatively widely between the displays.

SUMMARY

In consideration of the above mentioned problem, an exemplary object of the invention is to provide a portable terminal which can use the two display surfaces formed on the separate bodies effectively.

A portable terminal according to an exemplary aspect of the invention includes a first body having a first display surface and a second body having a second display surface, which first body and second body are jointed through a hinge unit in a foldable way, and which first display surface and second display surface form one combined display continuously at a time of opening the first body and the second body, and a display control unit which displays information throughout the combined display.

EXEMPLARY EMBODIMENT

Referring to the drawings, a preferred exemplary embodiment of a portable terminal according to the invention will be described in detail. In the following exemplary embodiment, a case where the portable terminal is a mobile phone will be described. In the description of the drawings, the same numerals are attached to the same components to omit the overlapped description.

Figure 1:
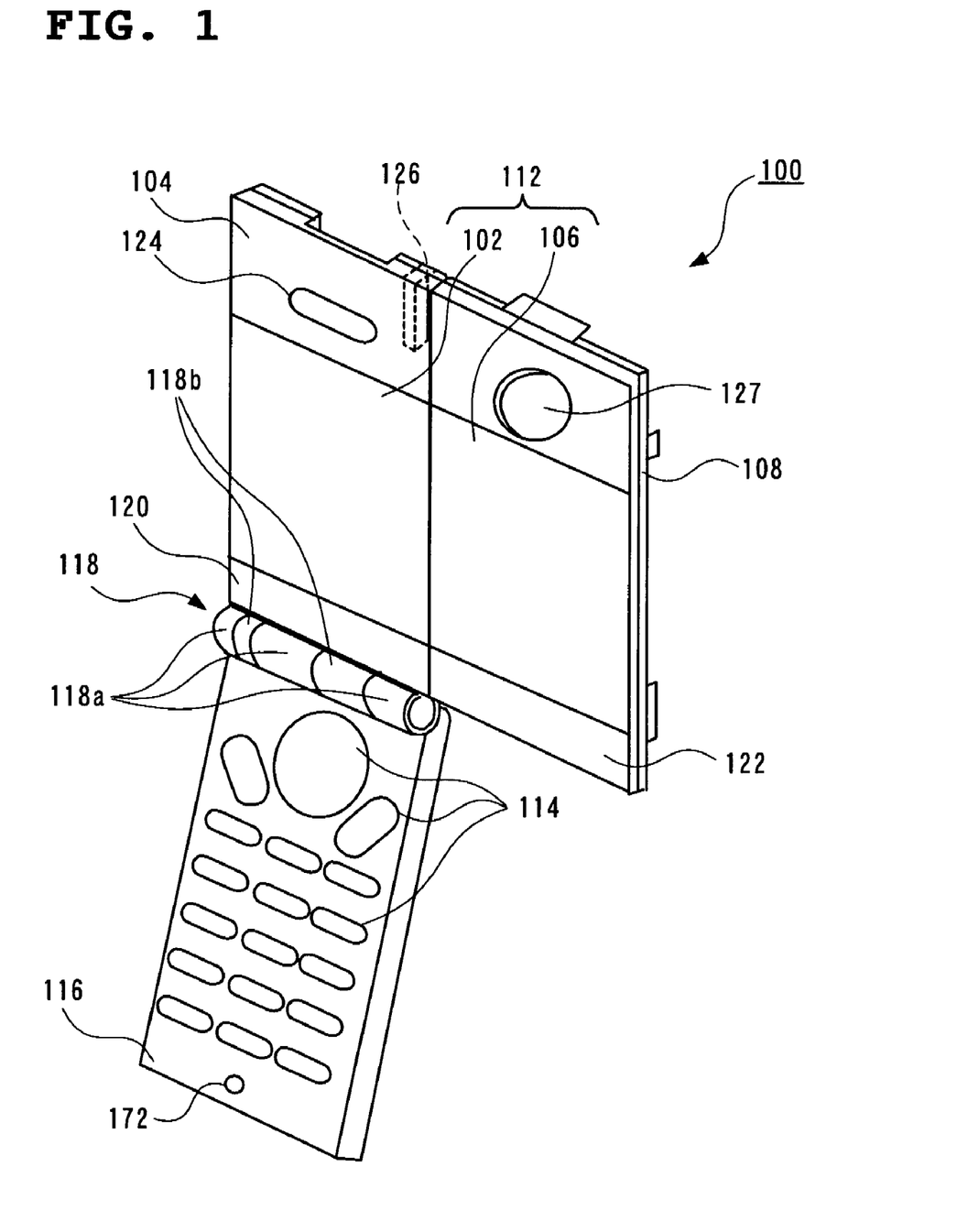
FIG. 1 shows a first exemplary embodiment of the invention and is an appearance perspective view of a mobile phone with the first body and the second body unfolded and the first body and the third body opened.
Figure 2:
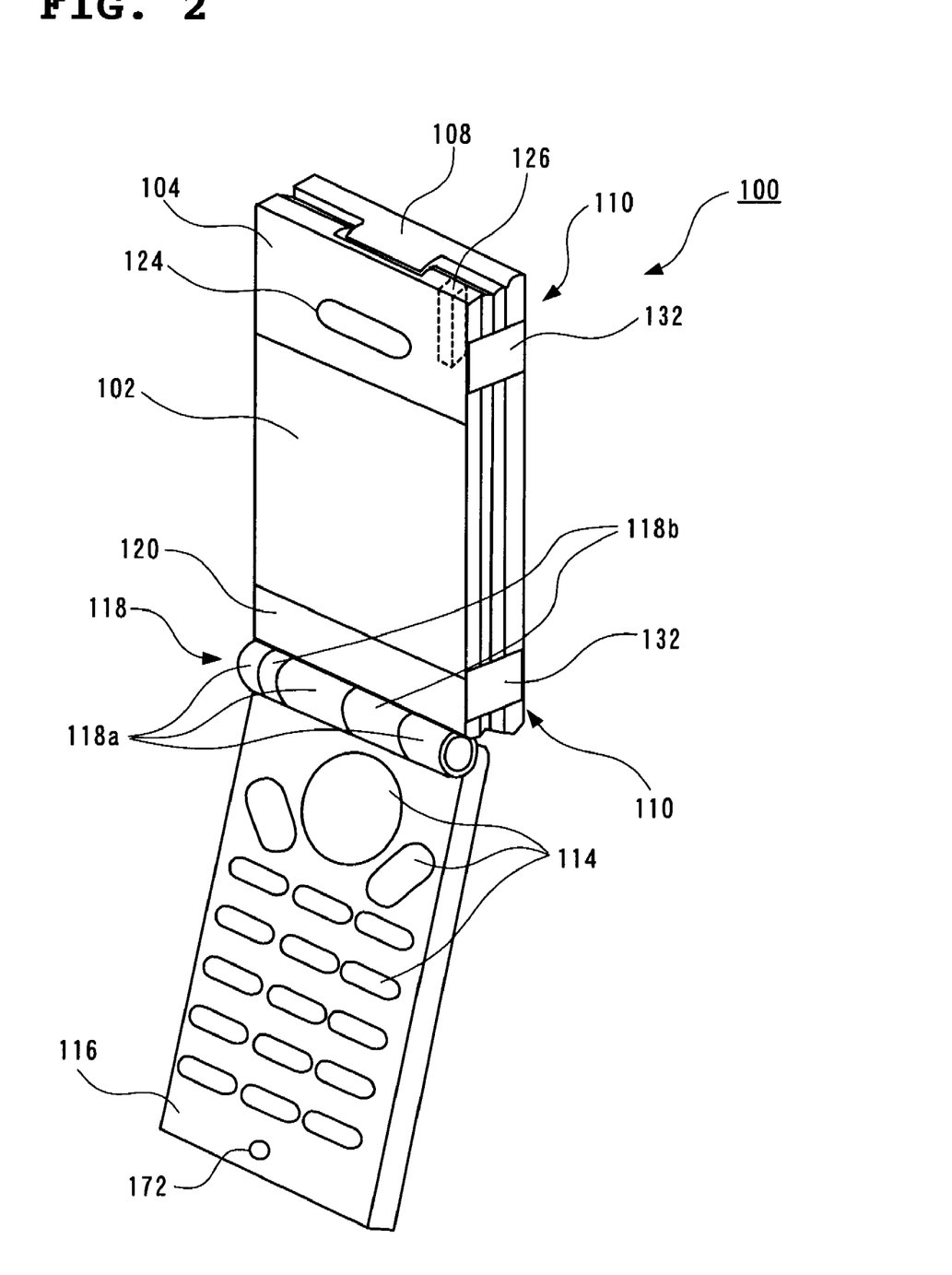
FIG. 2 is an appearance perspective view of a mobile phone with the first body and the second body folded and the first body and the third body opened.
Figure 3:
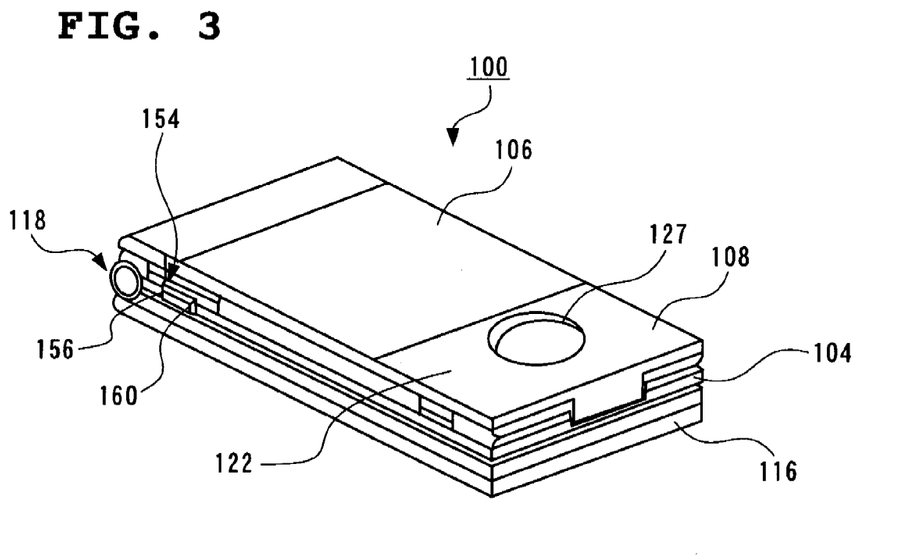
FIG. 3 is an appearance perspective view of a mobile phone with the first body and the second body folded and the first body and the third body folded.

FIG. 1 to FIG. 3 are appearance perspective views of a mobile phone according to the exemplary embodiment of the invention. FIG. 1 shows the mobile phone in a state of opening the first body and the second body and further opening the first body and the third body, FIG. 2 shows the mobile phone in a state of folding the first body and the second body and opening the first body and the third body, and FIG. 3 shows the mobile phone in a state of folding the first body and the second body and further folding the first body and the third body.

As shown in FIG. 1, a mobile phone 100 as the portable terminal comprises a first body 104 including the first display surface 102, a second body 108 including the second display surface 106, and hinge units (two shafts hinge units 110 (refer to FIG. 2)) for connecting the first body 104 and the second body 108 with each other in a foldable way. The mobile phone 100 is formed so that the first display surface 102 and the second display surface 106 may form one combined display 112 seamlessly at a time of opening the first body 104 and the second body 108. The mobile phone 100 is provided with a display control unit (a memory 214 and a control unit 216 (refer to FIG. 11)) for displaying one information on the combined display 112.

As shown in FIG. 1, the mobile phone 100 comprises a third body 116 on which operation keys 114 are arranged and one shaft hinge unit 118 for joining the third body 116 with the first body 104 in a foldable way.

The first body 104 and the second body 108 are respectively formed in a substantially rectangular plate. The first body 104 and the second body 108 have the substantially same plane shape and their outer fringe portions nearly agree with each other in a folded state as shown in FIG. 2. When the first body 104 and the second body 108 are folded, the first display surface 102 and the second display surface 106 are positioned back to back. Specially, a forming side 120 of the first display surface 102 in the first body 104 faces toward a user, like the operation key 114 of the third body 116 and a forming side 122 of the second display surface 106 in the second body 108 is at the back side of the first display surface 102, that is, at the opposite side to the user.

As shown in FIG. 2, the first body 104 is formed in a rectangle shape, joined with the third body 116 at one of the two short sides of the rectangular, and joined with the second body 108 at one of the two long sides. The first display surface 102 is formed on the formation side 120 in the middle portion between the short sides from the long side portion having the two shafts hinge units 110 to the other long side portion.

A speaker 124 for ear receiving is arranged on the forming side 120 of the first display surface 102 in the first body 104. The speaker 124 is arranged on the upper short side (in FIG. 1) from the first display surface 102 of the forming side 120. An antenna 126 is buried in the upper short edge of the first body 104.

As shown in FIG. 2, the second body 108 is formed in a rectangle shape and joined with the first body 104 at one side of the two long sides. It is formed from the long side portion having the two shafts hinge units 110 to the opposite long side portion.

As mentioned above, since the first display surface 102 and the second display surface 106 are formed to the edge of the long side portion having the two shafts hinge unit 110 on the forming sides 120 and 122, when a user opens the first body 104 and the second body 108, the first display surface 102 and the second display surface 106 form one combined display 112 seamlessly as shown in FIG. 1. In other words, a boundary portion between the first display surface 102 and the second display surface 106 in the combined display 112 is formed to corresponding to the end portions of the forming sides 120 and 122 of the first display surface 102 and the second display surface 106 in the first body 104 and the second body 108.

A camera 127 for picking up images is arranged on the forming side 122 of the second display surface 106 in the second body 108. The camera 127 is arranged at the upper short side (in FIG. 1) from the second display surface 106 on the forming side 122.

Figure 4:
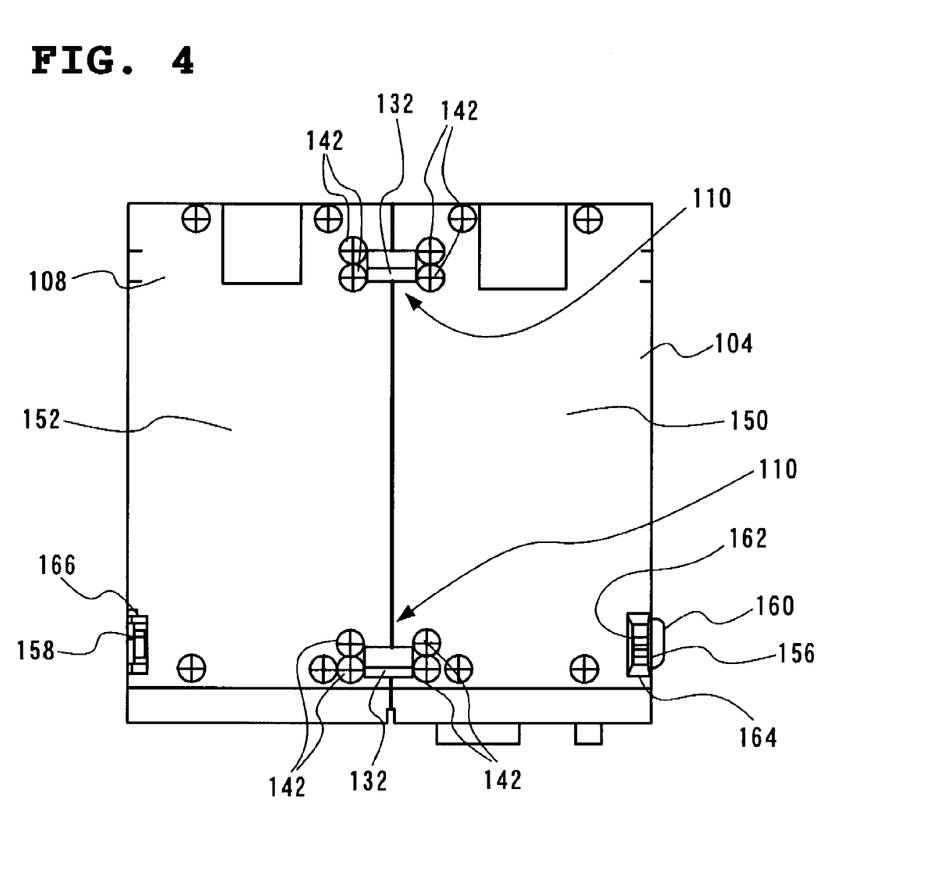
FIG. 4 shows a back view of the first body and the second body which are opened.

FIG. 4 shows a back view of the first body and the second body in an open state.

As shown in FIG. 4, the two shafts hinge units 110 are formed to be positioned at the back side of the combined display 112 of the first body 104 and the second body 108, that is, at the back side of the forming sides 120 and 122 of the first display surface 102 and the second display surface 106 when a user opens the first body 104 and the second body 108. In the exemplary embodiment, the two shafts hinge units 110 are set in the long end portion of the bodies 104 and 108 at the sides of the upper and lower short ends. That is, a pair of the two shafts hinge units 110 are set at two positions in the long end portion.

Figure 5:
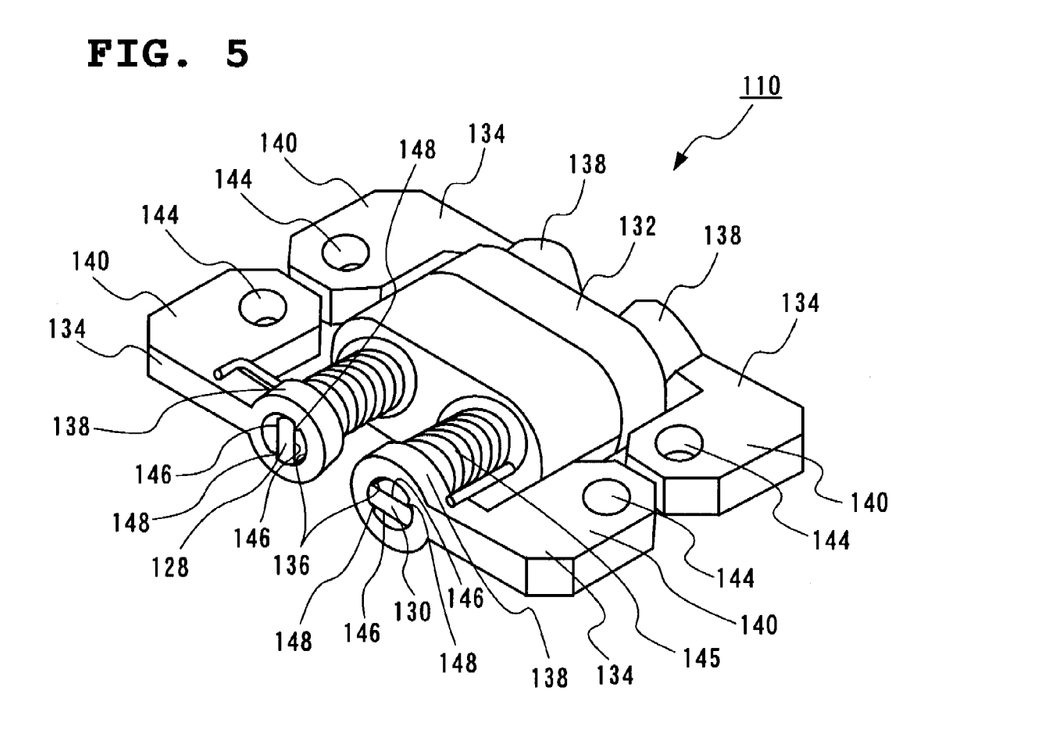
FIG. 5 is an appearance perspective view of a two shafts hinge unit which is opened.

FIG. 5 is an appearance perspective view of the two shafts hinge unit in an open state.

As shown in FIG. 5, each of the two shafts hinge unit 110 has a first shaft member 128 provided for the first body 104, a second shaft member 130 provided for the second body 108, and a link member 132 with which the both ends are connected to the first shaft member 128 and the second shaft member 130 in a rotatable way. Each of the two shafts hinge unit 110 has fixing blocks 134 which are fixed to the first body 104 for supporting the both ends of the first shaft member 128 in a rotatable way.

The fixing blocks 134 are set in the both ends of the first shaft member 128 and each of the fixing blocks 134 has a disc portion 138 with a through hole 136 for penetrating the first shaft member 128 and a plate portion 140 which is integrally formed to be orthogonal to the disc portion 138. The plate portions 140 of the respective fixing blocks 134 are formed to be close to each other in a way of extending in a shaft direction of the first shaft member 128. A fixing hole 144 is formed on the plate portion 140, for screwing a fixing screw 142 on the first body 104. The fixing blocks 134 fixed to the second body 108 are also joined with the both ends of the second shaft member 130, similarly to the first shaft member 128.

As shown in FIG. 5, the two shafts hinge unit 110 has springs 145 as urging members for urging the first body 104 and the second body 108 toward an opened direction. In the exemplary embodiment, the springs 145 are respectively set for the first shaft member 128 and the second shaft member 130. More specifically, the spring 145 is formed in a coil shape for winding the first shaft member 128 or the second shaft member 130, whose one end is fastened to the fixing block 134 and the other end is fixed to the link member 132.

The two shafts hinge unit 110 is formed to allow the first body 104 to rotate round the first shaft member 128 within about 90° angle and allow the second body 108 to rotate around the second shaft member 130 within about 90° angle.

Figure 6:
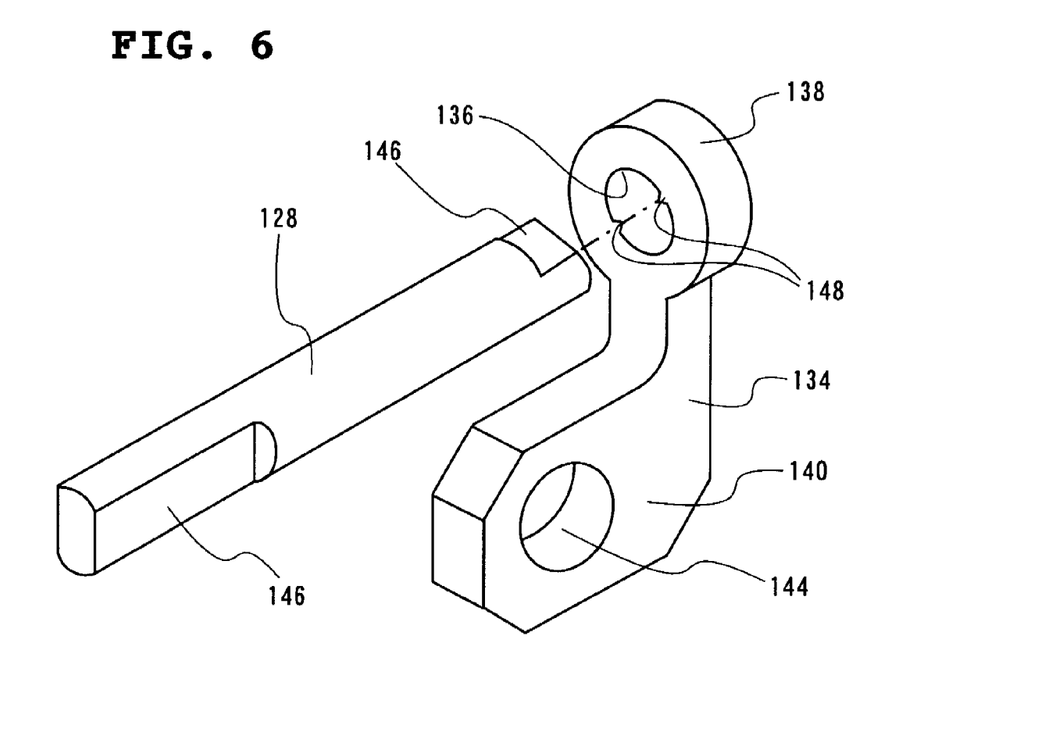
FIG. 6 is an exploded perspective view of a first shaft member and a fixing block.

FIG. 6 is an exploded perspective view of the first shaft member and the fixing block.

In the exemplary embodiment, as shown in FIG. 6, the first shaft member 128 and the second shaft member 130 are formed into a cylindrical shape. Flat portions 146 with one of the outer periphery cut away are formed at the both ends of each of the shaft members 128 and 130, in pairs symmetrically around the shaft center. As shown in FIG. 6, the respective flat portions 146 at the both ends of each of the shaft members 128 and 130 are formed deviated from each other by about 90° angle around the shaft in an orthogonal way.

Figure 7:
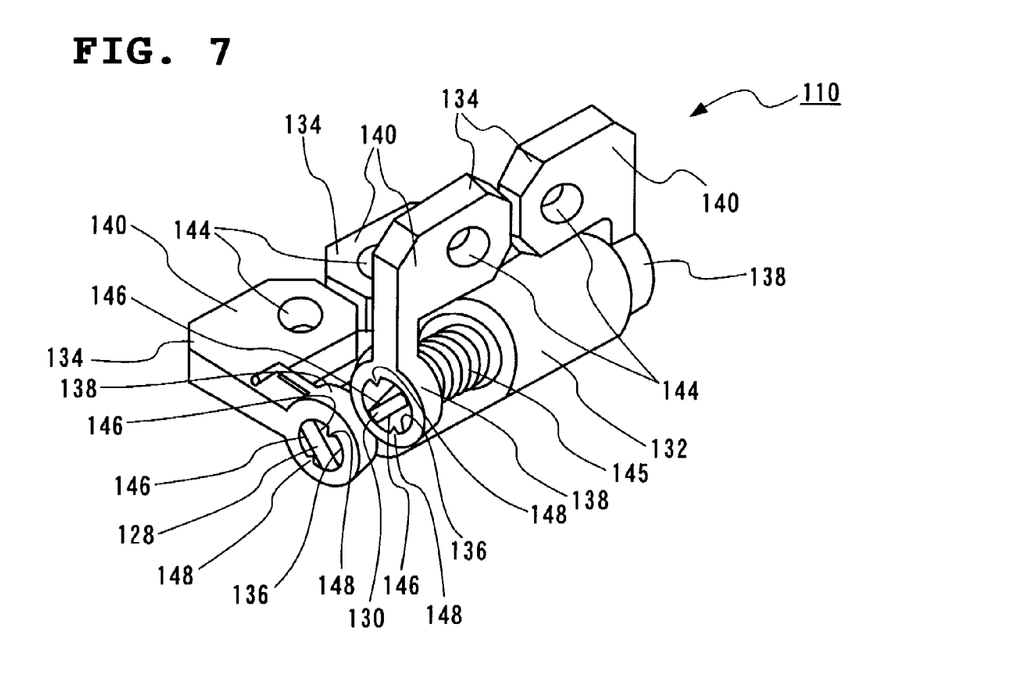
FIG. 7 is an appearance perspective view of a two shafts hinge unit in a middle state between a folding state and an open state.
Figure 8:
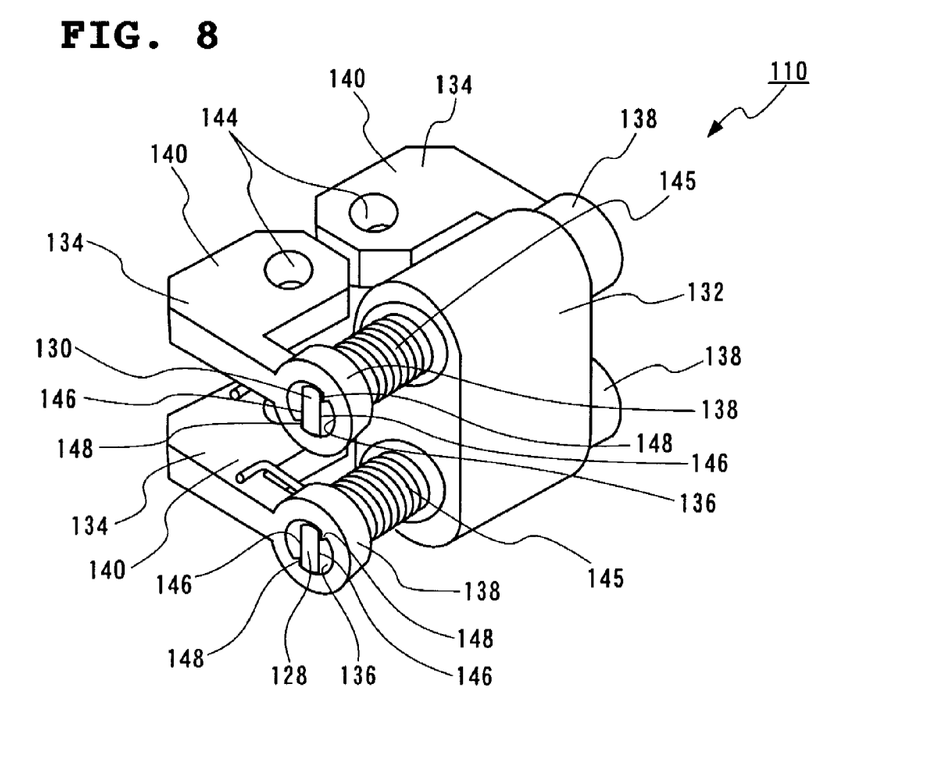
FIG. 8 is an appearance perspective view of a two shafts hinge unit which is folded.

As shown in FIG. 6, a pair of restrictive projections 148 are formed symmetrically around the shaft center in an inner periphery of the through-hole 136 of the fixing block 134. Here, the respective through-holes 136 and the shaft members 128 and 130 have the substantially same diameter. At the assembly time, the shaft members 128 and 130 are inserted into the respective through-hole 136 so that the respective cut-off portions of the shaft members 128 and 130 obtained by forming the respective plate portions 146 may abut against the respective pairs of the restrictive projections 148. Owing to this, the shaft members 128 and 130 are in contact with the respective inner peripheral surfaces of the respective through holes 136 in a slidable way, which allows the rotation in two directions until the flat portions 146 abut against the respective pairs of the restrictive projections 148, as shown in FIG. 7 and FIG. 8. FIG. 7 is an appearance perspective view of the two shafts hinge unit in the middle state between a folded state and an open state and FIG. 8 is an appearance perspective view of the two shafts hinge unit in a folded state. The link member 132 is joined with the first shaft member 128 and the second shaft member 130 with no restriction to the angle of the rotation.

The same members are used for the first shaft member 128 and the second shaft member 130 and the same members are used for the four fixing blocks 134 in total. Since the fixing blocks 134 are used by turning over the plate portions 140 at the both ends of the shaft members 128 and 130, the formed positions of the respective pairs of restrictive projections 148 are mutually deviated by about 90° around the respective shafts. In this time, since the mutual plate portions 146 are deviated by about 90° from each other around the respective shafts at the both ends of the shaft members 128 and 130, rotation is allowed in the same range at the both ends of the shaft members 128 and 130.

The fixing blocks 134 fixed to the first body 104 and the fixing block 134 fixed to the second body 108 are substantially in parallel in a folded state as shown in FIG. 8 and they are line symmetric with the midpoint between the shaft members 128 and 130 in an open state as shown in FIG. 5. Owing to this, the formed positions of the respective pair of the restrictive projections 148 in the fixing blocks 134 rotate around the shafts at the same angle respectively in the first body 104 and in the second body 108, in any case of the folded state and the open state.

In the open state as shown in FIG. 5, since the first shaft member 128 and the second shaft member 130 are arranged deviated by about 90° from each other around the shafts, the opposite rotation is allowed between the first body 104 and the second body 108. That is, by rotating the first body 104 and the second body 108 around the respective shaft members 128 and 130 in the mutually opposite directions, the bodies 104 and 108 can be opened and closed.

As shown in FIG. 4, in the two shafts hinge unit 110, the heads of the screws 142 are exposed to the back surfaces 150 and 152 of the forming sides 120 and 122 of the first body 104 and the second body 108, and the link member 132 is exposed between the first body 104 and the second body 108. The other members than the heads of the screws 142 and the link member 132 are not exposed to the outside. In the exemplary embodiment, the link member 132 is formed to extend in the shaft direction and a portion connecting the first shaft member 128 and the second shaft member 130 is formed flat. The link member 132 becomes parallel with the lateral surfaces of the bodies 104 and 108 in the folded state and becomes parallel with the back surfaces 150 and 152 of the bodies 104 and 108 in the open state. The surface of the link member 132 becomes substantially flat with the lateral surfaces of the bodies 104 and 108 in the folded state and it becomes substantially flat with the back surfaces 150 and 152 of the bodies 104 and 108 in the open state.

As shown in FIG. 3, a lock mechanism 154 for locking the bodies 104 and 108 in the folded state is set at the long end portion opposite to the two shafts hinge unit 110 in the first body 104 and the second body 108.

Figure 9:
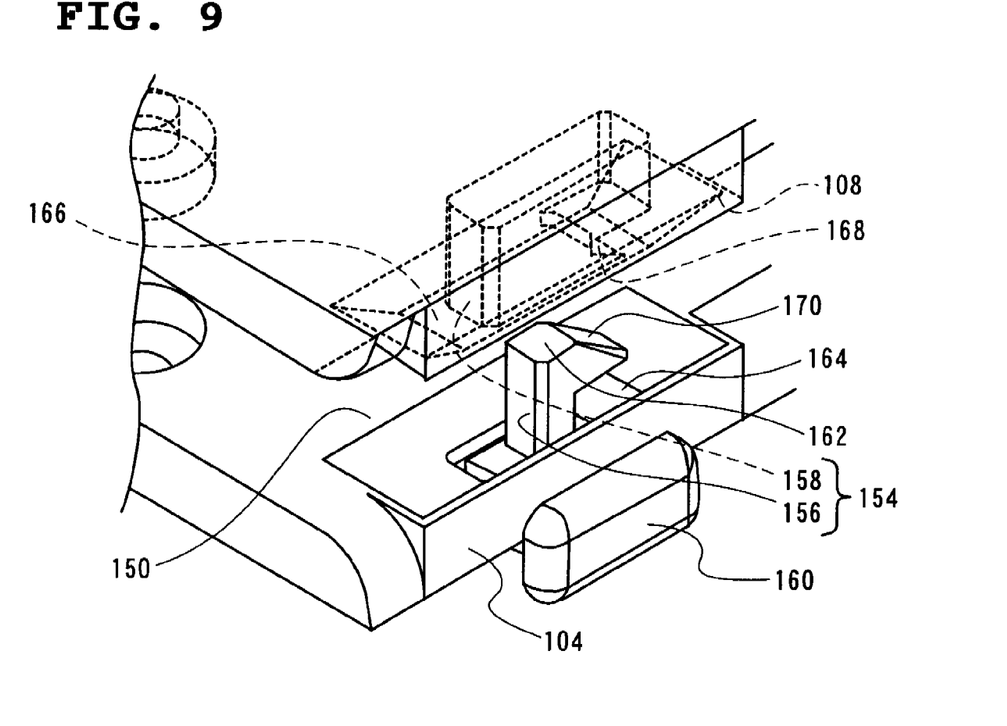
FIG. 9 is an explanation drawing of a lock mechanism.

FIG. 9 shows an explanation view of the lock mechanism.

As shown in FIG. 9, the lock mechanism 154 has a lock member 156 movable along the long end portion which is set near the one shaft hinge unit 118 in the first body 104 and a lock hole 158 formed on the back surface 152 of the second body 108 to be engaged with the lock member 156. The lock member 156 has an unlock operation unit 160 projecting from the lateral side of the first body 104 and an engaged portion 162 projecting from the back surface 150 of the first body 104 to be engaged with the lock hole 158.

An acceptive portion 164 lower than the other portions is formed around of the engaged portion 162 on the back surface 150 in the first body 104. Correspondingly to this, a protuberance 166 higher than the other portions is formed around the lock hole 158 on the back surface 152 in the second body 108. The fringe portions of the acceptive portion 164 and the protuberance 166 have inclined surface into contact with each other. That is, when the first body 104 and the second body 108 are folded, the inclined surface of the acceptive portion 164 abuts on the inclined surface of the protuberance 166 and the protuberance 166 is held into the acceptive portion 164. As the result, while positioning the back surfaces 150 and 152 of the bodies 104 and 108, the engaged portion 162 is guided into the lock hole 158.

The lock member 156 is urged to the opposite side of the one shaft hinge unit 118 by a spring member not illustrated. As shown in FIG. 9, the engaged portion 162 of the lock member 156 is formed in a hook shape and the distal end protrudes to the opposite side of the one shaft hinge unit 118. Correspondingly to this, the lock hole 158 is formed by a cave portion extending parallel with the back surface 152 and integrally with the longitudinal hole, in addition to the longitudinal hole accepting the base portion of the engaged portion 162. The first body 104 and the second body 108 are locked when the distal end of the engaged portion 162 is engaged in the cave portion.

An inclined surface 168 is formed (just below the cave portion in FIG. 9) in a way of inclining downwardly from the cave portion of the lock hole 158 in the protuberance 166 of the second body 108. An inclined plane 170 is formed on the distal end of the engaged portion 162 in the first body 104 so as to abut on the inclined surface 168.

Owing to this, when the first body 104 and the second body 108 are folded from the open state, the inclined surface 168 of the protuberance 166 abuts on the inclined plane 170 of the engaged portion 162 and the lock member 156 moves toward the one shaft hinge unit against the urging force of the spring member. When the distal end of the engaged portion 162 comes into the longitudinal hole of the lock hole 158 and reaches the formed position of the cave hole, the urging force of the spring member forces the lock member 156 to move, so that the distal end of the engaged portion 162 plunges into the cave hole. In this way, the first body 104 and the second body 108 are locked.

In order to release the lock, the unlock operation unit 160 is operated against the urging force of the spring member to move the lock member 156 toward the one shaft hinge unit 118 so that the distal end of the engaged portion 162 is detached from the cave hole of the lock hole 158. When the first body 104 and the second body 108 are moved to the opening direction, the engaged portion 162 is removed from the lock hole 158. At this time, since the bodies 104 and 108 are urged by the springs 145 of the respective two shafts hinge units 110 in the opening direction, it is easy to detach the engaged portion 162 from the lock hole 158.

As shown in FIG. 1 and FIG. 2, cylinder portions 118*a* forming an outer shell of the one shaft hinge unit 118 are integrally formed in the first body 104 and cylinder portions 118*b* forming the outer shell of the one shaft hinge unit 118 are integrally formed also in the third body 116. These cylinder portions 118*a* and 118*b* are aligned in the shaft direction and the outer shells for the one shaft hinge unit 118 form one cylindrical shape. Inside the cylinder portions 118*a* and 118*b*, a positioning mechanism for positioning the first body 104 and the third body 116 in the folded state and in the open state is provided. Inside the cylinder portions 118*a* and 118*b*, a flexible substrate for electrically connecting the first body 104 and the third body 116 is also provided.

Operation keys 114 including a scroll/decision key, a ten-key, and a side key are arranged on the third body 116 and a microphone 172 for call is also set there. The microphone 172 is arranged in the opposite side of the one shaft hinge unit 110. When the first body 104 and the third body 116 are folded, the speaker 124 of the first body 104 and the microphone 172 of the third body 116 are housed in a substantially facing way.

Figure 10:
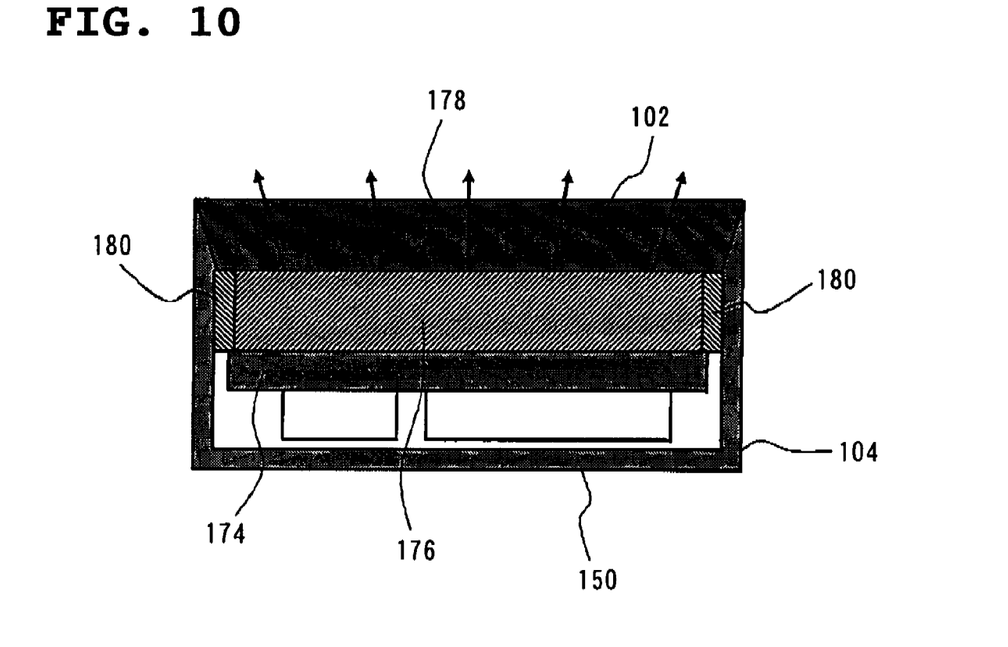
FIG. 10 is a cross-sectional view of the first body.

FIG. 10 is a cross-sectional view of the first body.

As shown in FIG. 10, the images displayed on a first display unit 176 set on a substrate 174 within the first body 104 are displayed on the first display surface 102 in an enlarged way through a first optical element 178. In the exemplary embodiment, the first display unit 176 is a first display element of crystal liquid formed flat in parallel with the first display surface 102. The first display unit 176 is formed smaller than the first display surface 102 from a view of flat surface and fixed at the long edge end portions of the first body 104 by a frame 180 formed on the outer fringe. That is, the first display unit 176 is set inside the first body 104 isolated from the outer fringe of the body. Owing to this, when there occurs such a situation that a user drops the terminal with an excessive shock occurring in the first body 104, the first display unit 176 can be fixed stably in the first body 104.

The first optical element 178 projects the light irradiated from the first display unit 176 to the whole area of the first display surface 102. As the optical element 178, as shown in FIG. 10, a flat one having a convex lens function is preferred and, for example, a Fresnel lens, a microlens array with optical axes deviated, and the like may be used. The optical element 178 is not formed by a lens material but may be formed by combining, for example, the Fresnel lens and the microlens array.

The second display surface 106 has the same structure as the first display surface 102 and the images of a second display unit 182 are displayed on the second display surface 106 in an enlarged way through a second optical element. The second display unit 182 is also set in parallel with the second display surface 106, and it is a second display element of liquid crystal smaller than the second display surface 106 from a view of flat surface. In the exemplary embodiment, the first display surface 102 and the second display surface 106, the first display unit 176 and the second display unit 182, and the first optical element 178 and the second optical element are respectively formed by the same components.

Figure 11:
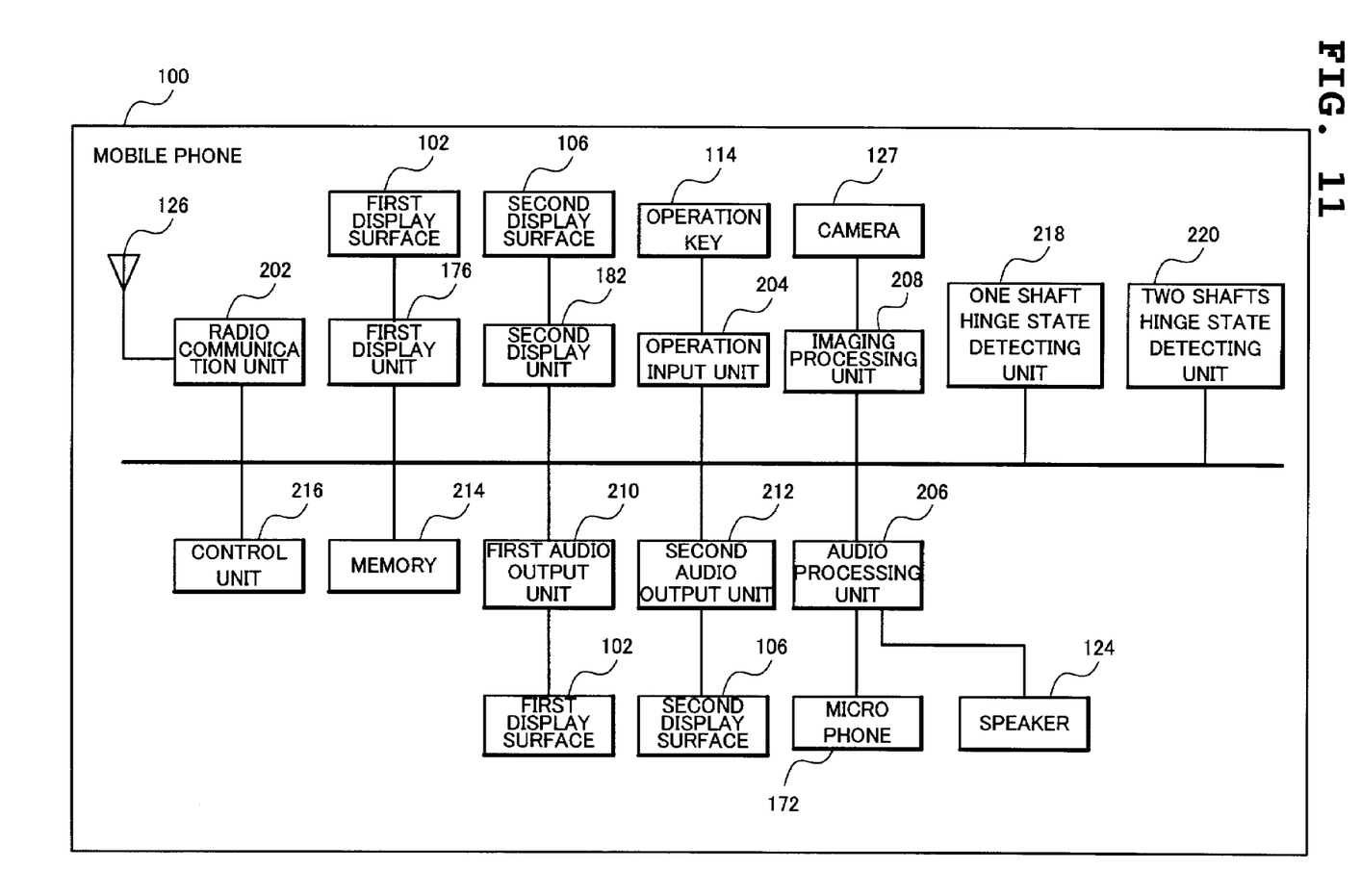
FIG. 11 is a schematic block diagram of a mobile phone.

A vibrator is connected to the first display surface 102 and a first audio output unit 210 which transmits a signal to the vibrator to vibrate the first display surface 102 and outputs the sound is provided (refer to FIG. 11). Similarly, the vibrator is connected to the second display surface 106 and a second audio output unit 212 which transmits the signal to the vibrator to vibrate the second display surface 106 and outputs the sound is provided (refer to FIG. 11).

FIG. 11 is a schematic block diagram of the mobile phone.

As shown in FIG. 11, the mobile phone 100 comprises a radio communication unit 202 which transmits and receives a radio signal to and from a radio base station through an antenna 126, the first display unit 176 which is arranged inside the first body 104 to output and display various kinds of information such as characters and images, the second display unit 182 which is arranged inside the second body 108 to output and display various kinds of information such as characters and images, an operation input unit 204 which is arranged in the third body 116 to enter the operation of various information through the operation key 114, an audio processing unit 206 which processes a sound signal by using the microphone 172 and the speaker 124, an imaging processing unit 208 which obtains the image information outside the terminal by using the camera 127, a first audio output unit 210 which outputs musical sound and notice sound by using the first display surface 102, a second audio output unit 212 which outputs the musical sound and the notice sound by using the second display surface 106, a memory 214 which stores telephone book information, transmitting and receiving mail information, content, various settings of the terminal, and program information, and a control unit 216 which controls a telephone function, a mail function, an Internet connection function, a camera function, display, and sound output.

The mobile phone 100 comprises a one shaft hinge state detecting unit 218 which detects whether the one shaft hinge unit 118 is in the folded state or open state and a two shafts hinge state detecting unit 220 which detects whether the two shafts hinge unit 110 is in the folded state or open state. Each of the hinge state detecting units 218 and 220 may comprise, for example, a magnet set in one body and a magnetic detecting element set in the other body or a switch set in one body and a convex portion for pushing the switch set in the other body.

The memory 214 stores a program which switches the display output state of the first display unit 176 and the second display unit 182, depending on the folded or open state of the bodies 104, 108, and 116 detected by the hinge state detecting units 218 and 220. In the exemplary embodiment, in the open state of the first body 104 and the third body 116, the information is displayed on the first display unit 176 when the first body 104 and the second body 108 are folded and the information is displayed on the first display unit 176 and the second display unit 182 in the open state of the first body 104 and the second body 108. When the first body 104 and the third body 116 are folded, the information is displayed on the second display unit 182. The memory 214 and the control unit 216 work as a display control unit. In the exemplary embodiment, when the first body 104 and the second body 108 are folded, the information is displayed on the first display surface 102.

The memory 214 stores a program which switches the sound output state of the first audio output unit 210 and the second audio output unit 212, based on the open or folded state of the bodies 104, 108, and 116 detected by the hinge state detecting units 218 and 220.

In the exemplary embodiment, in the open state of the first body 104 and the third body 116, the sound is output by using the first audio output unit 210 when the first body 104 and the second body 108 are folded, and the sound is output by using the first audio output unit 210 and the second audio output unit 212 in the open state of the first body 104 and the second body 108. When the first body 104 and the third body 116 are folded, the sound is output by using the second audio output unit 212. The memory 214 and the control unit 216 work as a sound control unit.

The memory 214 stores a program for selectively switching the information display between a one screen display mode for displaying the information throughout the whole combined display 112 and an individual screen display mode for displaying individual information on the first display surface 102 and the second display surface 106 respectively at the open time of the first body 104 and the second body 108 based on predetermined conditions. In the exemplary embodiment, each mode is selected through the operation input from the operation key 114.

Figure 12:
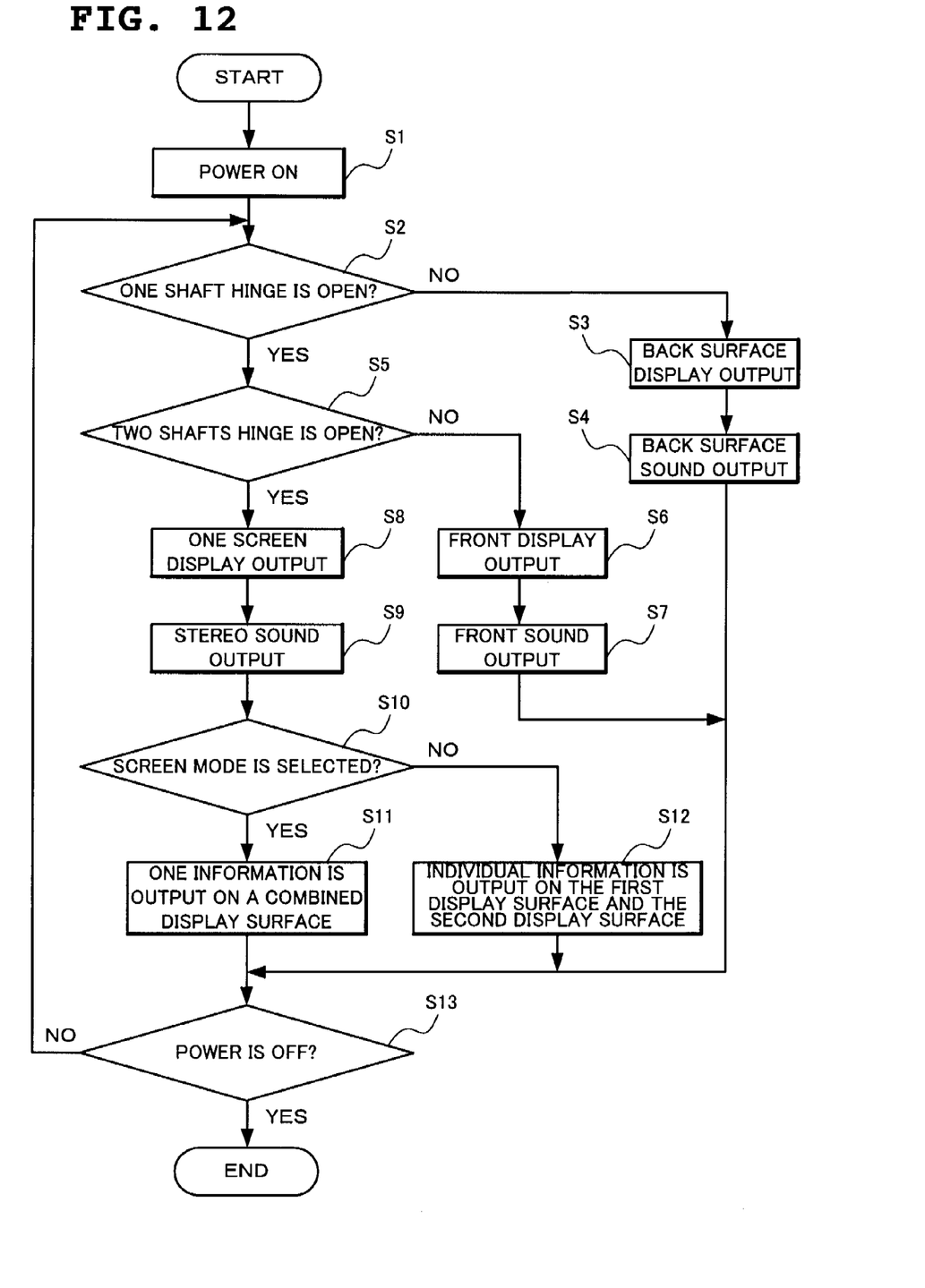
FIG. 12 is a flow chart showing the operation of the mobile phone.

The operation of the control unit 216 of the mobile phone 100 will be described referring to the flow chart of FIG. 12.

When the mobile phone 100 is powered on (Step S1), it is checked whether the one shaft hinge unit 110 is in the open state, that is, whether the first body 104 and the third body 116 are in the open state (Step S2). This check is performed based on the detection output of the one shaft hinge state detecting unit 218.

When it is judged that the first body 104 and the third body 116 are folded (Step S2: No), the back surface display is supplied by using the second display unit 182 (Step S3) and the back surface sound is supplied by using the second audio output unit 212 (Step S4). Namely, in the state of closing the first body 104 and the third body 116, since the second display surface 106 of the second body 108 is exposed to the outside and the first display surface 102 of the first body 104 is not exposed, the second display surface 106 is used to perform various outputs.

In Step S2, when the first body 104 and the third body 116 are judged to be open (Step S2: Yes), it is further checked whether the two shafts hinge unit 118 is in the open state, that is, whether the first body 104 and the second body 108 are open (Step S5). This check is performed based on the detection output of the two shafts hinge state detecting unit 220.

When it judges that the first body 104 and the second body 108 are closed (Step S5: No), the front display is supplied by using the first display unit 176 (Step S6) and the front sound is supplied by using the first audio output unit 210 (Step S7). Namely, in the state of opening the first body 104 and the third body 116 and folding the first body 104 and the second body 108, since the first display surface 102 of the first body 104 is positioned at the user side and the second display surface 106 of the second body 108 is positioned at the opposite side to the user, the first display surface 102 is used to perform various outputs.

In Step S5, when the first body 104 and the second body 108 are judged to be open (Step S5: Yes), one screen display is supplied by using the first display unit 176 and the second display unit 182 (Step S8) and the stereo sound is supplied by using the first audio output unit 210 and the second audio output unit 212 (Step S9). Namely, in the state of opening the first body 104 and the third body 116 and further opening the first body 104 and the second body 108, since the first display surface 102 of the first body 104 and the second display surface 106 of the second body 108 are positioned at the user side, the first display surface 102 and the second display surface 106 are used to perform various outputs.

After Step 9, it is checked whether the one screen display mode is selected (Step S10): when it is selected (Step S10: Yes), the information is displayed on the whole combined display 112 (Step S11). When the one screen display mode is not selected (Step S10: No), the individual information is respectively displayed on the first display surface 102 and the second display surface 106 (Step S12).

After Step S4, Step S7, Step S1, and Step S12, it is checked whether the power is OFF (Step S13). When the power is ON (Step S13: No), the processing is returned to Step S2 where the states of the respective hinge units 110 and 118 are monitored. When the power is OFF (Step S13: Yes), a series of operations is finished.

In the mobile phone 100 formed as the above, since the first display surface 102 and the second display surface 106 form a combined display 112 in the open state of the first body 104 and the second body 108, the area of the combined display 112 is the sum of the areas of the first display surface 102 and the second display surface 106 and compared with the display of a single screen on the first display surface 102 or the second display surface 106, a significantly larger screen display is possible. The information can be displayed on the larger screen.

The first display surface 102 and the second display surface 106 are seamless and there is no obstruction such as the fringe portions of the hinge unit and the body in the boundary between the first display surface 102 and the second display surface 106, which makes it possible to display one information across the display surfaces 102 and 106.

In the portable terminal, although the display area tends to become smaller than that of the terminal for home use, it is possible to display the information in large size and improve the visibility of the display screen dramatically by using the combined display 112. Even when the video corresponding to the terminal for home use is displayed there, a sufficient visibility is secured. Therefore, a communication via a TV phone is possible corresponding to the terminal for home use.

When the first display surface 102 and the second display surface 106 display the individual information separately, since the first display surface 102 and the second display surface 106 are continuous, a user can check the respective information on the first display surface 102 and the second display surface 106 without moving his or her line of sight so much.

According to the mobile phone 100 of the exemplary embodiment, since the first display surface 102 and the second display surface 106 form one combined display 112 seamlessly in the open state of the first body 104 and the second body 108, the two display surfaces 102 and 106 respectively formed on the bodies 104 and 108 can be used effectively. A desire to form one screen by the separate display surfaces of the two bodies is realized by using the structure of the exemplary embodiment.

According to the mobile phone 100 of the exemplary embodiment, since the two shafts hinge units 110 are positioned at the back of the forming sides 120 and 122 of the combined display 112 in the open state of the first body 104 and the second body 108, the area of the first display surface 102 and the second display surface 106 can be secured larger, because the hinge joint portions do not exist on the forming sides 120 and 122. Since the two shafts hinge units 110 are out of the view of a user watching the combined display 112, it is possible to give a simple and plain impression to a user in the open state the bodies 104 and 108.

Since the first body 104 and the second body 108 are mutually joined by the two shafts hinge units 110 each having the first shaft member 128 of the first body 104, the second shaft member 130 of the second body 108, and the link member 132 whose both ends are joined with the shaft members 128 and 130, the hinge joint portions do not protrude from the bodies 104 and 108 so much, differently from the one shaft hinge joint. Like the exemplary embodiment, the shaft members 128 and 130 are respectively buried in the bodies 104 and 108 and the link member 132 is arranged inside the bodies 104 and 108, thereby preventing the hinge joint portions from protruding from the bodies 104 and 108. In this way, since there is no protrusion in the hinge joint portions, the terminal can be made compact and convenient.

Even when the first body 104 and the second body 108 mutually rotate at a 180° angle, the two shaft members 128 and 130 can take charge of rotation of 90° respectively, thereby making the hinge joint portions comparatively compact. Owing to this, without protrusion of the hinge joint portions, the bodies 104 and 108 can be folded in one accord and the bodies 104 and 108 can be opened in a way of getting a smooth surface closely with the hinge joint portions.

In the exemplary embodiment, since the link member 132 becomes flat with the lateral surfaces of the bodies 104 and 108 in the folded state and it becomes flat with the back surfaces 150 and 152 of the bodies 104 and 108 in the open state, the bodies 104 and 108 appear like one plate. Therefore, a simple impression can be given to a user.

In the exemplary embodiment, since the images in the first display unit 176 and the second display unit 182 arranged isolatedly from the outer body portion are projected on the first display surface 102 and the second display surface 106 by the first optical element 178 and the second optical element, it is possible to display the images properly even on the boundary portion between the first display surface 102 and the second display surface 106 in the combined display 112. Namely, even when the display units 176 and 182 are not arranged along the outer body portion corresponding to the formed positions of the display surfaces 102 and 106, it is possible to fix them firmly to the outer body portion by using the frame 180, not to damage the reliability and durability of the display units 176 and 182.

In the exemplary embodiment, since it can be switched between the one screen display mode and the individual screen display mode at the time of opening the first body 104 and the second body 108, when video and image are displayed, the one screen display mode is selected to display the information large and when a telephone book and a mail address are displayed, the individual screen display mode is selected to display a lot of information at once. Namely, a user can switch the screen display according to the information, which is practically convenient.

In the exemplary embodiment, since the first display surface 102 and the second display surface 106 are positioned back-to-back oppositely in the folded state of first body 104 and the second body 108, it is possible to display the information on the display screens 102 and 106 even in the folded state. Since the display state is automatically switched according to the state of folding and opening the first body 104, the second body 108, and the third body 116, a user can use it very conveniently.

Since the sound is supplied from the first display surface 102 and the second display surface 106, stereo sound can be supplied in the open state of the first body 104 and the second body 108. Since it is supplied correspondingly to the portion with the information displayed on the first display surface 102 and the second display surface 106, the sound is always supplied to the side of user.

In the exemplary embodiment, since the first body 104 and the second body 108 are urged in the opening direction by the springs 145, they are folded at the lock time by the lock mechanism 154 and they are always open at the release time. Thus, the first body 104 and the second body 108 are not kept in an unstable posture between the folded state and the open state, excessive load is not imposed on the two shafts hinge units 110, and it is possible to reduce the load imposed on a connection member connecting the first body 104 and the second body 108 electrically.

In the exemplary embodiment, since the lock is released by moving the unlock operation unit 160 in one direction, the unlock operation is simple and easy. By folding the first body 104 and second body 108 from the open state, the lock member 156 is automatically engaged in the lock hole 158, and therefore, the lock operation is also simple and easy.

In the exemplary embodiment, since the components are shared in the first display surface 102, the first display unit 176, and the first optical element 178 and the second display surface 106, the second display unit 182, and the second optical element, production cost can be reduced. In the two shafts hinge unit 110s, the first shaft member 128 and the second shaft member 130 are shared parts and the four fixing blocks 134 are the same member, thereby reducing the production cost.

In the exemplary embodiment, though the mobile phone 100 is shown as an example of the portable terminal, it is needless to say that the portable terminal may be a PHS and a PDA.

Though the mobile phone 100 has the three bodies 104, 108, and 116 by way of example, the number of bodies may be two, four, or more. Namely, the number of bodies does not matter as long as the display surface is formed on at least the two bodies and the display surface form one combined display seamlessly at the time of opening the bodies having the display surfaces.

Though the exemplary embodiment has shown the mobile phone having the first body 104 and the second body 108 joined by the two shafts hinge units 110, they may be joined by using the one axis hinge unit as long as the first display surface 102 and the second display surface 106 are designed to form one combined display 112 seamlessly. In this case, it is preferable that the hinge unit is arranged on the back of the forming sides 120 and 122 of the combined display 112.

Figure 13:
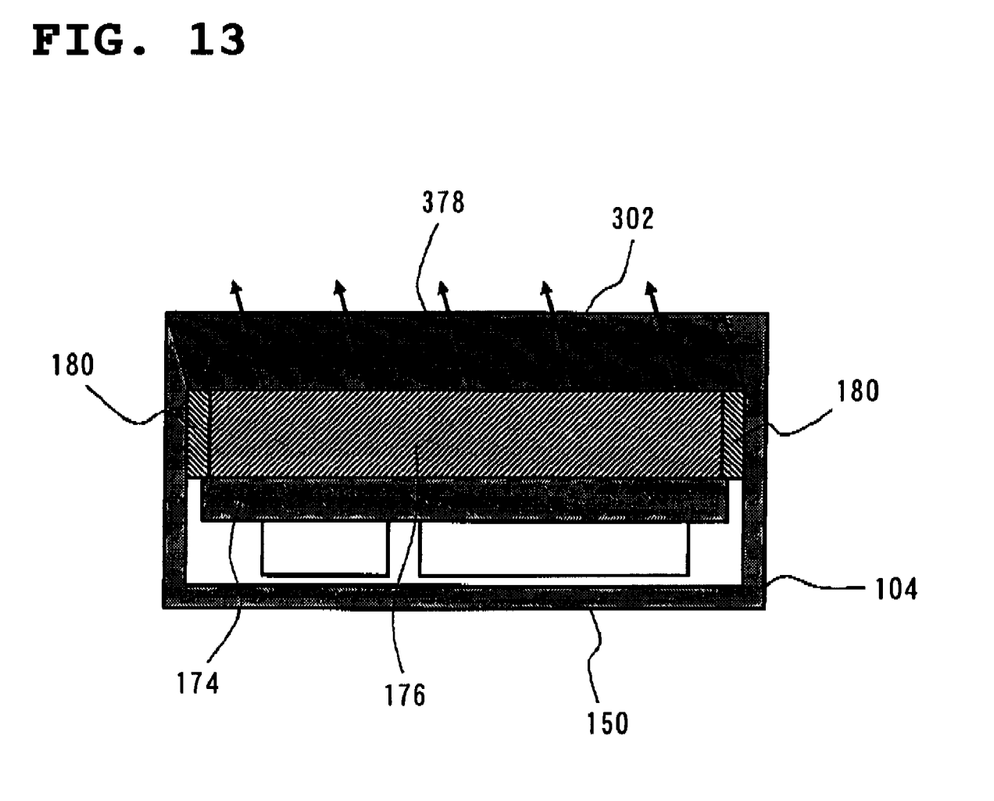
FIG. 13 is a cross-sectional view of the first body showing a modification exemplary.

Though the exemplary embodiment has shown the mobile phone in which the images on the first display unit 176 and the second display unit 182 is enlarged and projected on the first display surface 102 and the second display surface 106, it is possible to form the first display unit 176 and the second display unit as the first display element and the second display element which respectively have the same size as the first display surface 302 and the second display surface from a view of flat surface as shown in FIG. 13, and to deviate the images on the first display unit 176 and the second display unit from a view of flat surface to be projected on the first display surface 302 and the second display surface. In this case, as shown in FIG. 13, the first optical element 378 and the second optical element shift the lights of the first display unit 176 and the second display unit to the first display surface 302 and the second display surface. As the optical element 378, for example, a fiber optic plate and the microlens array whose optical axes are deviated may be used. It is not necessary to form the optical element 378 by one member such as lens but, for example, the microlens array may be combined with a diffraction grating and a wedge prism.

When the first display unit 176 and the second display unit 182 are not a plate shaped display element, it is possible to project the lights of the first display unit and the second display unit on the whole forming area of the first display surface 102 and the second display surface 106 by using, for example, an aspheric mirror as the optical element.

Though the exemplary embodiment has shown the mobile phone in which the first display surface 102 and the second display surface 106 are formed across the end portions of the first body 104 and the second body 108, it is possible to form the display surfaces 102 and 106 on the combined display 112 seamlessly even when a minute seal member is attached to the outer fringes of the display screens 102 and 106.

Though the exemplary embodiment has shown the mobile phone in which the first body 104 and the second body 108 are urged in the open direction by the springs 145, the bodies 104 and 108 do not have to be urged. In this case, it may be provided with a positioning mechanism for determining the positions of the bodies 104 and 108 in the folded and open states.

The structure of the lock mechanism 154 is optional and needless to say, the other specific construction can be modified properly.

In the portable terminal, since the first display surface and the second display surface form one combined display at a time of opening the first body and the second body, area of the combined display becomes the sum of the first display surface and the second display surface, so that a significantly larger screen display can be realized compared with the terminal having the first display surface and the second display surface displaying the images individually. Therefore, one information can be displayed on the larger screen by using the combined display.

Since the first display surface and the second display surface are continuous, a user can realize the information on the combined display without moving his or her eyes widely. Since there is no obstruction such as the hinge or outer frame of a body in a boundary portion between the first display surface and the second display surface, one information can be displayed without sense of discomfort.

Although the display surface of the portable terminal tends to be smaller than a terminal for home use, it can display the information in larger size through the combined display, thereby improving visibility of the display screen dramatically. That is, even when a video corresponding to the terminal for home use is displayed on the portable terminal, sufficient visibility can be secured.

In this way, according to the portable terminal of the invention, since the first display surface and the second display surface form a combined display continuously at a time of opening the bodies, the two display screens respectively formed on the separate bodies can be used effectively.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INCORPORATION BY REFERENCE

This application is based upon and claims the benefit of priority from Japanese patent application No. 2005-057455, filed on Mar. 2, 2005, the disclosure of which is incorporated herein in its entirety by reference.

The invention claimed is:

1. A portable terminal, comprising:
a first body having a first display surface and a second body having a second display surface, which first body and second body are jointed through a hinge unit in a foldable way, and which first display surface and second display surface form one combined display continuously at a time of opening said first body and said second body; and
a display control unit which displays information throughout said combined display, wherein said hinge unit is positioned at back surfaces of said combined display in said first body and said second body in the open state of said first body and said second body, wherein said hinge unit comprises
a first shaft member set in said first body,
a second shaft member set in said second body, and
a link member whose ends are connected to said first shaft member and said second shaft member in a rotatable way, wherein a surface of said link member is substantially flat with the lateral surfaces of said first body and said second body in the folded state and is substantially flat with the back surfaces of said first body and said second body in the open state, and wherein said first shaft member and said second shaft member each extend within said link member.

2. The portable terminal according to claim 1, wherein
a boundary portion between said first display surface and said second display surface in said combined display is positioned at end portions of said first display surface and said second display surface of said first body and said second body, and
a first display unit which is arranged inside said first body isolatedly from an outer shell,
a first optical element which projects lights irradiated from said first display unit on the whole forming area of said first display surface,
a second display unit which is arranged inside said second body isolatedly from the outer shell, and
a second optical element which projects lights irradiated from said second display unit on the whole forming area of said second display surface, are comprised.

3. The portable terminal according to claim 2, wherein
said first display unit is arranged in parallel with said first display surface and is a first flat display element which is smaller than said first display surface from view of flat surface,
said second display unit is arranged in parallel with said second display surface and is a second flat display element which is smaller than said second display surface from view of flat surface, and
said first optical element and said second optical element project images displayed on said first display element and said second display element on said first display surface and said second display surface in an enlarged way.

4. The portable terminal according to claim 2, wherein
said first display unit is arranged in parallel with said first display surface and is a first flat display element which has almost the same size as said first display surface from a view of flat surface,
said second display unit is arranged in parallel with said second display surface and is a second flat display element which has almost the same size as said second display surface from a view of flat surface, and
said first optical element and said second optical element project the images displayed on said first display element and said second display element on said first display surface and said second display surface in a way of deviating in a view of flat surface.

5. The portable terminal according to claim 1, wherein
said display control unit switches between a one screen display mode for displaying one information on said whole combined display and an individual screen display mode for displaying individual information separately on said first display surface and said second display surface forming said combined display, based on a predetermined condition at a time of opening said first body and said second body.

6. The portable terminal according to claim 1, wherein
said first display surface and said second display surface are positioned back to back at a time of folding said first body and said second body.

7. The portable terminal according to claim 6, in which
said display control unit displays information on said first display surface at a time of folding said first body and said second body.

8. The portable terminal according to claim 7 comprising
a first audio output unit which outputs sound vibrating said first display surface, a second audio output unit outputs sound vibrating said second display surface, and a sound control unit which outputs the sound by using said first audio output unit at a time of folding said first body and said second body and outputs the sound by using said first audio output unit and said second audio output unit at a time of opening said first body and said second body.

9. The portable terminal according to claim 1, further comprising a third body including operation keys, which is joined with said first body through a hinge unit in a foldable way.

* * * * *

UNITED STATES PATENT AND TRADEMARK OFFICE
CERTIFICATE OF CORRECTION

PATENT NO. : 8,253,648 B2
APPLICATION NO. : 11/817108
DATED : August 28, 2012
INVENTOR(S) : Michio Nagai and Hideo Mitsuhashi Page 1 of 1

It is certified that error appears in the above-identified patent and that said Letters Patent is hereby corrected as shown below:

In the Specifications:

Column 9, Line 55: delete "S1," and insert -- S11, --

Signed and Sealed this
Third Day of September, 2013

Teresa Stanek Rea
*Acting Director of the United States Patent and Trademark Office*